J. Berry,
Making Cut Nails,
No. 27,096.      Patented Feb. 14, 1860.
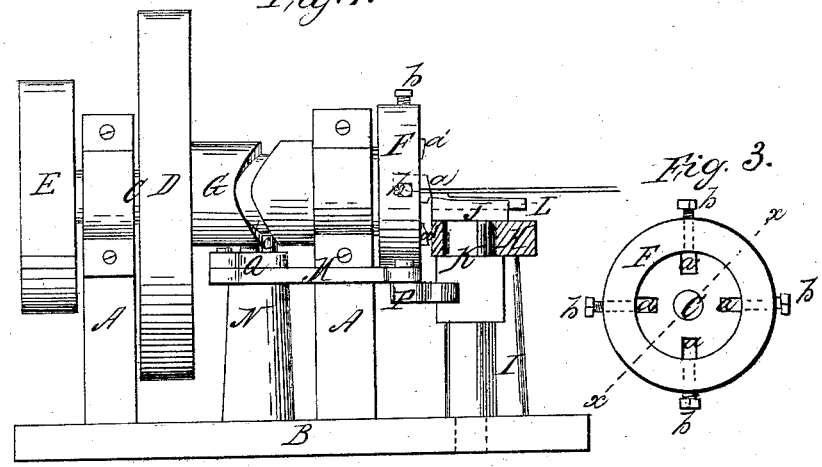
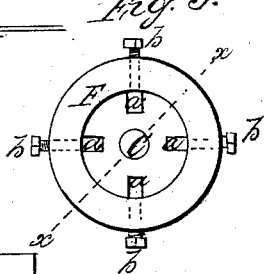
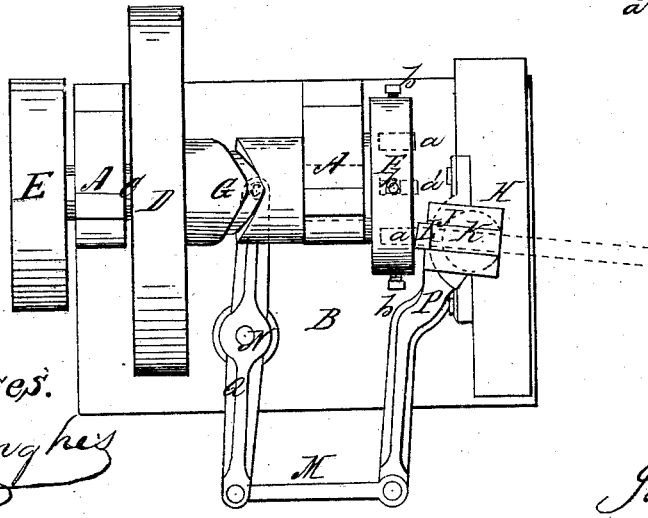
Witnesses.
Mich. Hughes
M M Lurupton
Inventor.
Joseph Berry

UNITED STATES PATENT OFFICE.

JOSEPH BERRY, OF NEW YORK, N. Y.

CUT-NAIL MACHINE.

Specification of Letters Patent No. 27,096, dated February 14, 1860.

*To all whom it may concern:*

Be it known that I, JOSEPH BERRY, of the city, county, and State of New York, have invented a new and Improved Cut-Nail Machine; and I do hereby declare that the following is a full, clear, and exact description of the same, reference being had to the accompanying drawings, forming part of this specification, in which—

Figure 1 is a side elevation of the machine with the anvil block in section. Fig. 2 is a plan of the same. Fig. 3 is a face view of the rotary cutter head. Fig. 4 is a section of the head through the center, in the plane indicated by the line $x, x$, of Fig. 3.

Similar letters of reference indicate corresponding parts in the several figures.

A, A, are two standards erected on a bed-plate B, and containing the bearings for a horizontal shaft C, to one end of which is secured the circular cutter head F, and which is also furnished with a fly wheel D, a cam-shaped groove G, for moving the oscillating anvil, and a pulley E, to receive a driving band. The cutter head has a flat face, and has an even number of radial slots, parallel with the axis of the shaft, to receive the cutters $a, a, a', a'$, which are secured in place by set screws $b, b$. The cutters are thus enabled to be brought near to the hub or center of the head F, where they move with sufficient slowness of speed as to cut the nails without injury to the edges of the cutters.

The usual method of arranging the cutters in rotary nail machines is to place them upon the periphery of the head, which must be large enough to present sufficient strength to hold the cutters firmly, and also of sufficient size to afford the necessary space for the fastenings of the cutters between each other. When thus arranged upon the periphery, if sufficient speed is given the head to enable the cutters to act upon the nail plate, the cutters necessarily move with so great speed that the edges of the cutters are soon destroyed. In fact I have ascertained by practical experience that it is impossible to employ such machines usefully, because the edges of the cutters break off almost at every stroke. The only way to obviate the difficulty would be to employ a train of gear wheels so as to diminish the speed of the cutter head which would be very cumbersome and expensive.

By arranging the cutters in slots upon the face of the cutter head, the cutters are brought toward the center, near to the driving shaft where they necessarily move slow; at the same time the outer portion or periphery of the cutter head serves to give strength and stability for the support of the cutters and sufficient basis or body of metal for the reception and firm holding of the adjusting screw $b$.

The cutters are so formed that their edges, which are radial or thereabout to the axis of the shaft, are oblique in reverse directions alternately to the plane of the face of the cutter head, those $a, a$, having their inner ends the most prominent and the intervening ones $a', a'$, having their outer ends the most prominent, as shown best in Fig. 4.

H, is the anvil block supported in front of the cutter head on two pillars I, I.

J, is the anvil cast on or otherwise secured to the top of an upright shaft K, which works in a bearing in the anvil block and a step in the bed-plate B.

L, is the die fitted to the anvil and having a sharp edge presented toward the cutter head. This die should have a groove the width of the nail plate for the said plate to slide in. The anvil shaft K, has a long arm P, attached, and this arm is connected by a rod M, with one end of a horizontal lever Q, which works on a fulcrum in a standard N, and whose opposite end is furnished with a stud $c$, which enters the groove of the cam shaped groove G. This groove is of such form that by its action on the lever it causes the anvil to oscillate once during every interval between the arrivals of the cutters at the die, and to hold the die stationary while each cutter passes it.

The operation of the machine is as follows: The belt having been thrown on the pulley E, the shaft and cutter head are caused to rotate and the anvil is caused to oscillate in such manner as to present the edge of its die parallel with the reversely arranged edges of the cutters, as the latter severally pass it. The nail plate, which is shown in red outline in Fig. 2, is then placed on the die by the person who attends the machine, and pushed forward against the face of the cutter head, which constitutes a stop or gage, and when the cutter passes the die a nail or nail blank is cut off. After every cut the plate is pushed forward, and every cutter in its turn cuts off a nail or blank, the oscillating movement of the rod along with the anvil and die, causing the thick end of the nail or blank to be cut from each edge of the nail plate in turn.

In nail machines that have a vibrating anvil it is essential that the anvil should be stationary at the moment the cut is made; otherwise the work is liable to be uneven and ragged. When cams and strapped connecting rods are used it is impossible that the anvil should be stationary at any time unless the main shaft is stopped. But by having a cam shaped groove upon the driving shaft to give motion to a pivoted lever as in my improvement it is obvious that by having the groove made straight at suitable intervals the anvil may be made to remain perfectly stationary at the desired moment.

What I claim as my invention, and desire to secure by Letters Patent, is:—

1. The arrangement of the cutters (*a*) upon the face of the cutter head F, near the center thereof substantially as and for the purpose herein shown and described.

2. The arrangement of the vibrating anvil J, cam shaped groove G, anvil shaft K, arm P, rod M, lever Q, as and for the purpose herein shown and described.

JOSEPH BERRY.

Witnesses:
MICH'L HUGHES,
M. M. LIVINGSTON.